US007224260B1

(12) United States Patent
Nowak

(10) Patent No.: US 7,224,260 B1
(45) Date of Patent: May 29, 2007

(54) SYSTEM AND METHOD OF TRACKING TIME AND ACTIVATING AN ALARM USING A DISTRIBUTED NETWORK

(76) Inventor: Franz-Marcus Nowak, 610 Braeside Dr., Arlington Heights, IL (US) 60004

( * ) Notice: Subject to any disclaimer, the term of this patent is extended or adjusted under 35 U.S.C. 154(b) by 1353 days.

(21) Appl. No.: 09/835,257

(22) Filed: Apr. 12, 2001

(51) Int. Cl.
*G08B 9/00* (2006.01)

(52) U.S. Cl. .............................. 340/286.02; 340/384.1; 340/309.4; 340/309.15; 340/601; 368/10; 368/12; 368/13; 368/73

(58) Field of Classification Search .......... 340/286.02, 340/384.1, 309.15, 309.4, 601; 368/10, 12, 368/13, 73
See application file for complete search history.

(56) References Cited

U.S. PATENT DOCUMENTS

| | | | |
|---|---|---|---|
| 4,281,994 A | | 8/1981 | Dell et al. |
| 4,534,012 A | | 8/1985 | Yokozawa |
| 4,701,862 A | | 10/1987 | Washizuka et al. |
| 5,163,444 A | | 11/1992 | Braverman |
| 5,422,862 A | | 6/1995 | Wisor |
| 5,499,316 A | | 3/1996 | Sudoh et al. |
| 5,499,317 A | | 3/1996 | Oh |
| 5,511,046 A | | 4/1996 | Vanderpal |
| 5,832,067 A | * | 11/1998 | Herold .................. 379/110.01 |
| 5,995,454 A | | 11/1999 | Yamaki |
| 6,229,430 B1 | * | 5/2001 | Smith Dewey ........ 340/286.02 |
| 6,678,215 B1 | * | 1/2004 | Treyz et al. ................... 368/10 |

OTHER PUBLICATIONS

Rojas, Peter, "Intellectual Property: Protecting it will be increasingly difficult," Red Herring, Dec. 4, 2000, pp. 108-111.
Kenny, David et al., "Contextual Marketing: The Real Business of the Internet," Harvard Business Review, Nov.-Dec. 2000, pp. 119-125.
Johnson, Neil F., et al., "Exploring Steganography: Seeing the Unseen," IEEE Computer, Feb. 1998, pp. 26-34.
"Power Play: Siemens is experimenting with a new kind of high-speed Internet access: via electricity lines," The Wall Street Journal, Sep. 18, 2000, p. R26.
Angwin, Julia, "Coming Attractions: A look at some of the gadgets that promise to make connecting to the Internet a lot simpler," The Wall Street Journal, Jun. 26, 2000, pp. R21-R24, R27, R28, R33, R34.
OnePage, available at http://www.onepage.com/index.html, (Visited May 21, 2001) 1 page.
Incanta, available at http://www.incanta.net/home/file_print_document.html, (Visited May 21, 2001) 1 page.

(Continued)

*Primary Examiner*—Tai Nguyen
(74) *Attorney, Agent, or Firm*—Brinks Hofer Gilson & Lione

(57) ABSTRACT

A clock includes a publicly accessible distributed network, a user interface, and a timing device or a personal computer. The timing device is configured to track universal time and harvest user selected media including text, graphics, sound, video and/or multimedia. The timing device plays the selected media in a programmed order with commercial media at a launch time. After harvesting the publicly accessible network, the media is played in a progressive sequence before the personal computer or the timing device interfaces a Site.

24 Claims, 12 Drawing Sheets

OTHER PUBLICATIONS

Perpetual Motion Software, available at http://www.skst.com/perpetualmotion/, (visited May 21, 2001) pp. 1-3.

Cypress Technologies, CTWinCorder Version 1 (Beta), available at http://www.cypressnet.com/Products/ctwincorder/ctwincorder.htm, (Visited May 21, 2001) 1 page.

ClockMan95—How it works and features, available at http://www.clockman95.com, (Visited May 21, 2001) pp. 1-5.

ClockMan95 Major Changes, available at http://www.clockman95.com, pp. 1-13.

JogglerPlus—4.9 by Leepoware, available at http://www.downlinx.com/proghtml/214/21422.htm, (Visited May 21, 2001) 1 page.

JoggerPlus Version 4.7.1, available at http://home.att.net/~leepoware, pp. 1-11.

* cited by examiner

SYSTEM AND METHOD OF TRACKING TIME AND ACTIVATING AN ALARM USING A DISTRIBUTED NETWORK

BACKGROUND

This invention relates to time keeping, and more particularly, to a system and a method that links a user to media through a distributed network at a requested time.

Distributed technology such as the Internet provides users with access to a variety of information and services. Many users access distributed networks to view or distribute information ranging from news to commercial offers. A number of companies advertise through distributed networks and solicit sales. These users create a large domain of information and services that are not always accessible or achieve their desired objectives.

A variety of software is available through distributed networks that measure and display time. Some of this software is also capable of playing a compact disc, simulating a tone, or decoding a media file. In some instances, the media file must be stored in memory before a media player can decode it. Some software cannot receive files or Uniform Resource Identifiers (URIs) or allow users to display up-to-the-minute or real time audio and visual news, headlines, or sports when the software is not connected to the network. Moreover, some of the software is event driven, meaning the software completes a search only when responding to a user response, such as a user actuating a keyboard command or clicking a button on a mouse. Accordingly, there is a need for a system and method that automatically communicates with a distributed network, harvests user selected media, and automatically plays the selected media in a pre-programmed order at a pre-programmed time.

BRIEF DESCRIPTION OF THE FIGURES

The components in the figures are not necessarily illustrated to scale, emphasis instead being placed upon the principles of the invention. Moreover, in the figures, like reference numerals designate corresponding parts and acts.

Figure 1:
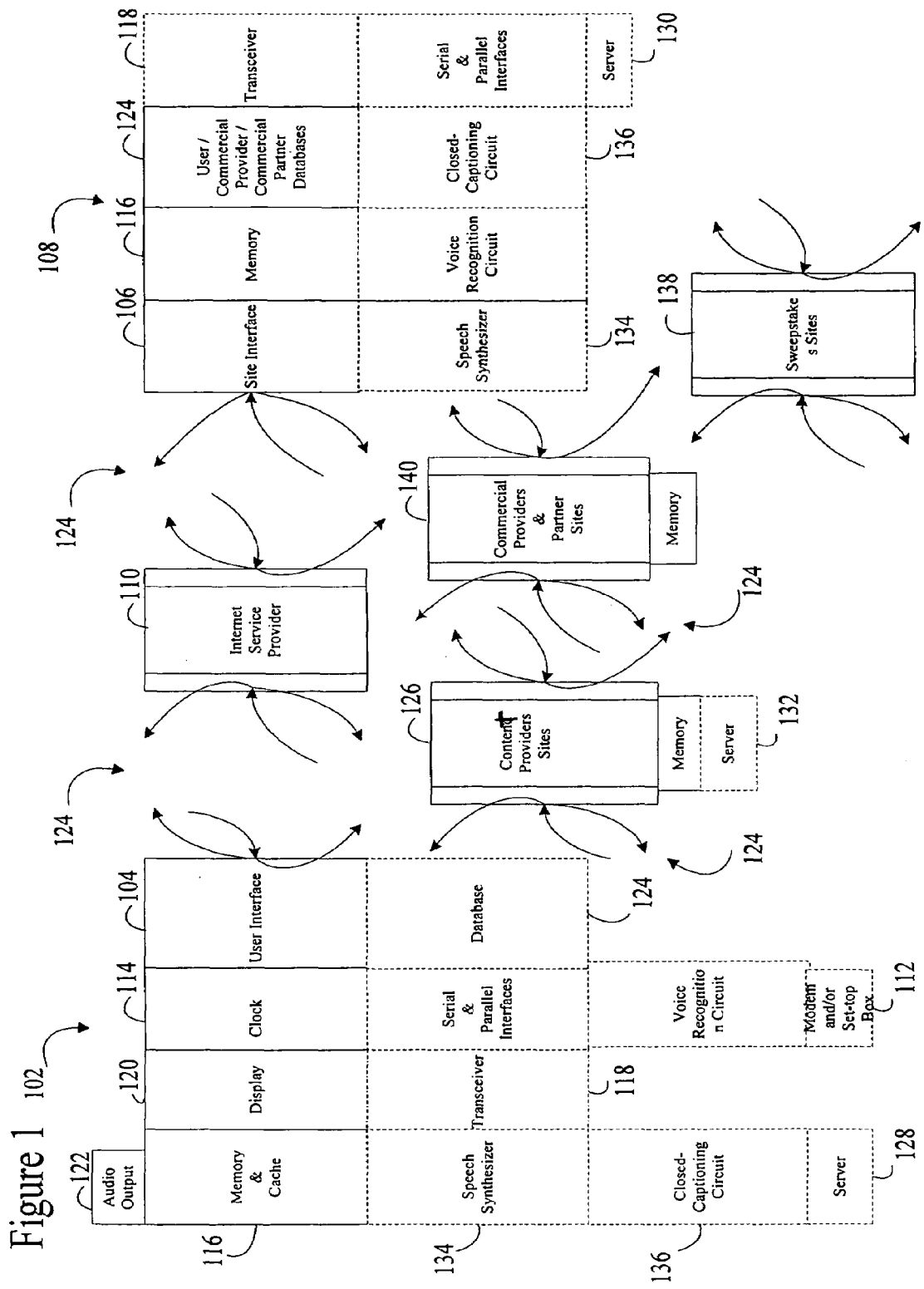
FIG. 1 is a block diagram of a first embodiment.

The dashed lines of FIG. 1 represent optional structure. As shown, the speech synthesizer, transceivers, modem, set-top box, etc., are not included in each variation of the first embodiment. Similarly, the dashed lines of FIGS. 2–12 illustrate that other acts can occur before or after each illustrated act. Likewise, the dashed boxes illustrate optional acts.

DETAILED DESCRIPTION OF THE PRESENTLY PREFERRED EMBODIMENTS

Mechanical and electronic timekeeping devices rely on a steady stream of timing pulses to track the passage of time. These devices can include an alarm that alerts a user to timed intervals. When a user sets the alarm, often the user cannot customize the device to display and/or broadcast selected up-to-the-minute or real time audio and/or visual information such as the news, headlines, and/or sports. Some of these systems may have only a short term affect on the user. Moreover, often retailers and service providers cannot use these devices to deliver a customized commercial solicitation or advertising that is designed to induce users to purchase goods and services. The disclosed system and method provide communication, media, multimedia, alarm, and clock functions that are easily programmed or manually set and can be customized by a user and/or a commercial provider.

FIG. 1 illustrates a system diagram of a preferred embodiment. The system comprises a timing device 102 and a Host Site 108. A user and a site interface 104 and 106 preferably couple the timing device 102 to the Host Site 108 by gateways that interconnect publicly accessible distributed networks such as the Internet 124 and/or privately accessible distributed networks. Preferably, a service provider, such as an Internet Service Provider (ISP) 110, connects the user and site interfaces 104 and 106 to the distributed network. An any-to-any connectivity makes it possible for the user and the site interfaces 104 and 106 to share data across multiple protocols, host types, site interfaces, and network topologies. A modem and/or set-top box 112, which are devices that convert data from one form to another, may couple landlines and/or wireless transceivers to provide alternative connectivity. In these embodiments, the modems, set-top boxes, 112 and/or transceivers are a unitary part of or integrated within the timing device 102, user interface 104, and/or site interface 106.

Preferably, the timing device 102 comprises a personal computer or a handheld standalone controller. As defined herein a handheld standalone controller is compact enough to be used or operated while being held in a user's hand and does not require support from another device, another system, or other software. The controller coordinates communication between the user interface 104, the site interface 106, the Host Site 108, and the distributed network. In this embodiment, the controller comprises an atomic clock or a time and frequency transceiver 118 configured to receive a broadcast containing a standard time signal such as the National Institute of Standards and Technology (NIST) short-wave radio station broadcasts WWV (Colorado) and WWVH (Hawaii). The timing device 102 automatically sets the time and the day of the week, automatically resets at the beginning and the end of daylight savings time, and automatically resets in the event of a power failure. The timing device 102 can also display the signal strengths of the NIST broadcasts. Of course, the controller can also comprise a mechanical and/or electrical clock that generates and measures a steady stream of timing pulses if the timing broadcasts are not received or a mechanical and/or electrical clock exclusively in alternative embodiments.

The controller operates under the control of a processor that provides a platform to execute media, multimedia and Internet applications. A non-volatile ROM, EEPROM, or FLASH memory stores code and data on a temporary ("volatile") and/or on a permanent ("non-volatile") basis. Unlike some non-volatile memory, the preferred FLASH memory is erased and programmed in blocks and in some preferred embodiments can interface five volt, three volt, and two volt buses. In one embodiment, the FLASH memory performs reading and programming operations simultaneously.

The controller acquires data, in part, through the user interface 104 with firmware that gives it independent decision-making ability. Preferably, the controller can be programmed and/or be manually set to sound a visual display 120 and/or an auditory output 122 (that are collectively referred to as an alarm) that are a unitary part of or integrated within the controller. The visual display 120 and audio output 122 may be progressive meaning the display 120 gets brighter and the volume gets louder until a user programmed or predetermined brightness or volume threshold is reached. In a preferred embodiment, when a time interval lapses, the visual display 120 and/or the audio output 122 is actuated that is preferably deactivated through an external event such as a switch or alternatively through a lapse of time. The deactivation may cancel the alarm or reset the alarm to reactivate the next day (i.e., within twenty-four hours of the previously set time).

When the controller connects to the distributed network, it initially connects to a Host Site 108 such as a Home Web Page. After connecting, the controller identifies itself, and identifies its current application software version and verifies the validity of URIs and/or URNs. If the Host Site 108 determines that the application software is outdated or that URIs and/or URNs are invalid, the Host Site 108 transfers a current version of the application software or current URIs and/or URNs to the controller before the controller performs its initialization or operating routines. The controller uses a remote upgrade capability to seamlessly update application software as needed.

The Host Site 108 includes a group of related Hypertext Markup Language (HTML) documents, eXtensible Mark Language (XML) and other associated software and files. In one embodiment, the controller enables the user to view the HTML documents, follow the hyperlinks that couple these documents, transfer files, execute programs such as Java or ActiveX, for example, and jump to other remote or resident Sites without additional/other/further user interaction. Preferably, the initial Site links are customized by the user and by one or more content providers or commercial partners. In this embodiment, the customized links allow the user to wake up to personalized audio and/or visual information intermixed with commercial media.

Figure 2:
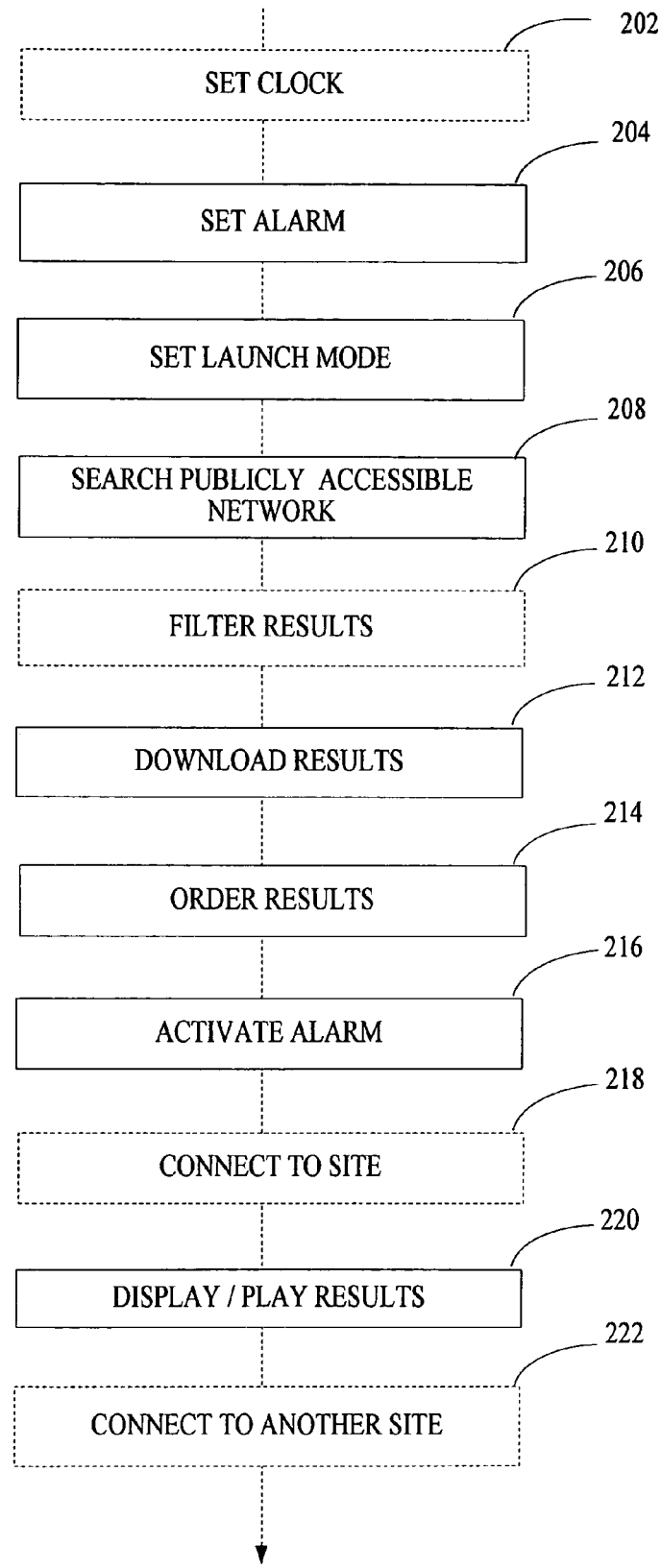
FIG. 2 is a flow diagram of FIG. 1.

As shown in FIG. 2, operation of the system and method begins with the optional act of setting the clock 114. In embodiments not using an atomic or synchronous clock, the time and the day is set by a system clock such as a computer clock, programmed, or manually set at act 202. Once the clock 114 is set, the alarm is programmed or set at act 204. The alarm may be configured to play audio files such as those files having extensions WAV, MIDI, and MP3, for example, and video or multimedia files such as those files that are encoded using moving picture experts group, MPEG, audio video interleaved, (AVI), advanced streaming formats (ASF), and other audio and video formats.

As shown In FIG. 2, the user customizes the system and method by setting the launch mode at act 206. The user controls the various aspects of the system and method, including the number of audio, visual, or multimedia files the system and method accesses, the user interface configuration, the system and method proxies (i.e., document caching and access control commands), the search strings, the exclusion strings, the file types, the Site selections, and the retrieval times. These preferences are programmed directly at the timing device 102 but can also be programmed indirectly through the Internet 124 interfacing the timing device 102 or the Host Site 108. At act 208, the system and method performs a search across multiple Sites to gather Uniform Resource Identifiers (URIs), Uniform Resource Names (URNs), and lists of available files, media, and documents. The media is stored in a file or database 124 within memory 116 at the Host Site 108 or at the timing device 102.

Once the media is identified, the system and method can filter and discard requests based on selected criteria defined by the user or by the commercial provider at optional act 210. The system and method selectively retains media, URIs and/or URN's and eliminates or discards other media. When the filtering is completed, the system and method downloads the media, URIs, or URNs at the programmed retrieval times and stores data in a database 124 such as an object-oriented database in one embodiment at act 212. Preferably, the database allows the media retrieval procedures and media processing rules to be stored in place of the media, URIs, and URNs allowing the media, URIs, and URNs to be stored in remote memory locations dispersed across the Internet 124, the Host Site 108, or within a single location. With this structure, the system and method can access large media files without programming large arrays of memory 116 resident to or interfaced to the Host Site 108 or the timing device 102. In alternative embodiments, the media is stored in ROM resident to the timing device.

The user's and commercial provider's preferences are combined and the media selections are ordered at act 214. Preferably, the combination is a collection of text, graphics, sound, video and/or multimedia (collectively referred to as media in this embodiment) that forms an associative system and method that automatically and seamlessly guides the user through subjects like a hypermedia or a hypertext program. The media, URI, and/or URNs order is based on many criteria and may include user preferences, commercial partner and content provider preferences, time and date of distribution or creation, sequential order, and/or the profit margin of a media combination or may be selected at random. At act 216, the system and method awakes and automatically selects a bit transfer rate and protocol. If a cache is used, the system and method clears the cache to store frequently accessed media, URIs, and URNs. At optional act 218, the system and method connects to the Sites (i.e., the content providers) identified by the URIs and URNs via the distributed network and the media is played at act 220. If the media includes URIs and URNs, a Web Server resident to the timing device 102, Host Site 108, or a remote Site plays the URI and URN media in real time. If the media are files retained in memory 116, a server resident to the Host Site 108 or the timing device 102 plays the media. At optional step 222, the system and method connects to one or multiple DumpSites selected by the user, the commercial partners, and/or content providers. In this embodiment a DumpSite is a destination Site or web address that the user is automatically sent to when the alarm is deactivated. The system and method can also surf through multiple selected Sites.

Figure 3:
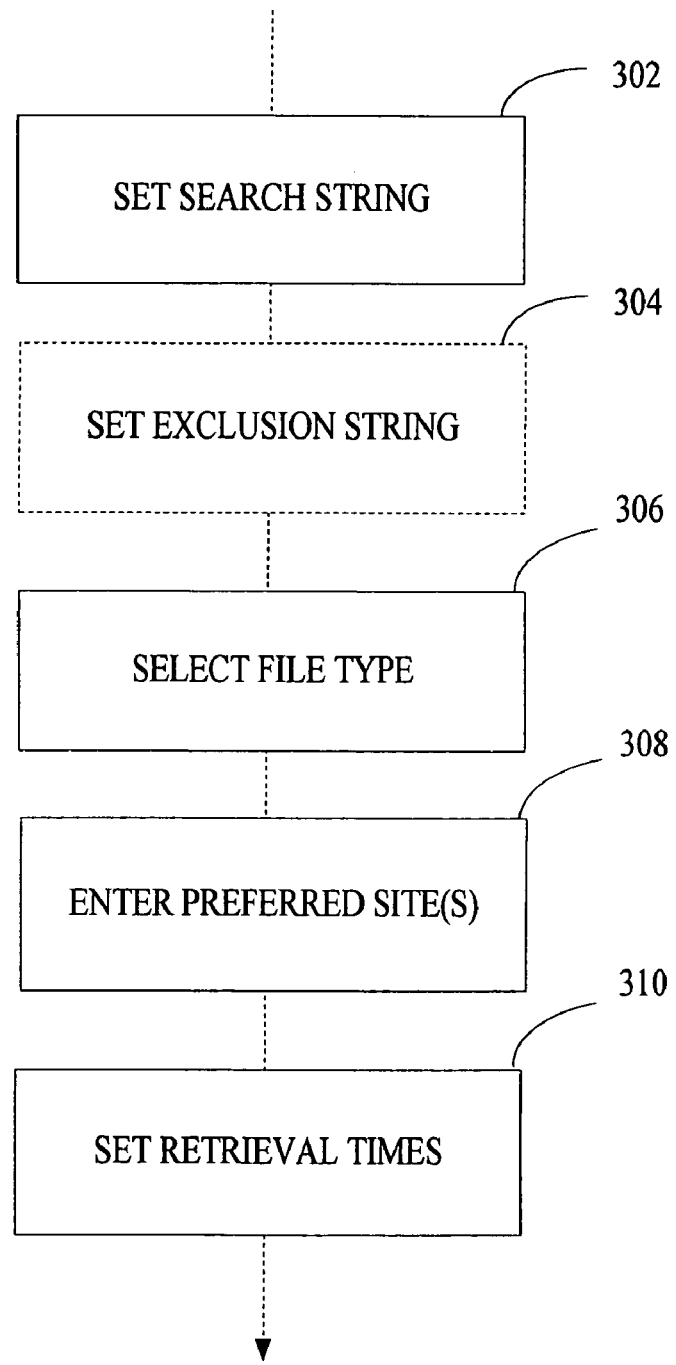
FIG. 3 is a partial flow diagram of a launch of FIG. 1.

As shown in FIG. 3, the user can program or set the search string, exclusion string, file types, preferred Sites, and retrieval times of the system and method. At act 302 the user defines a search string. While the search string will frequently be a text or a character string, the user may also request graphics or other media sequences in alternative embodiments. At optional act 304, the user identifies the data to be excluded from the search or customizes built in filtering technology. In those embodiments that perform Boolean searches, preferably a logical negation occurs at act 304. In alternative embodiments, image recognition technology is employed that examines the pixels on Sites before blocking the content that the technology identifies to be within the excluded subject matter. At act 306, the file types are defined. At this act, the user designates the operational and structural characteristics of the files. Preferably, the user defines the file extensions. At act 308, the user defines the preferred Sites. This act allows the user to customize selections to user interests and further makes the system and method accessible to users with disabilities. In one embodiment, if a user is visually impaired, act 308 allows the user to limit Site selections to Sites that are compatible with speech synthesizers that turn words on the display 120 into artificially-generated voices or to Sites that substitute descriptive text for graphical images. In addition, users with hearing impairments may limit Site selections to Sites that incorporate closed-captioning systems. In alternative embodiments, a speech synthesizer 134 and/or a closed-captioning circuit 136 interface or are a unitary part of the timing device 102 and/or the Host Site 108. At act 310, the user programs or sets the media retrieval times. This field establishes the time in which the system and method access information through the distributed network.

Figure 4:
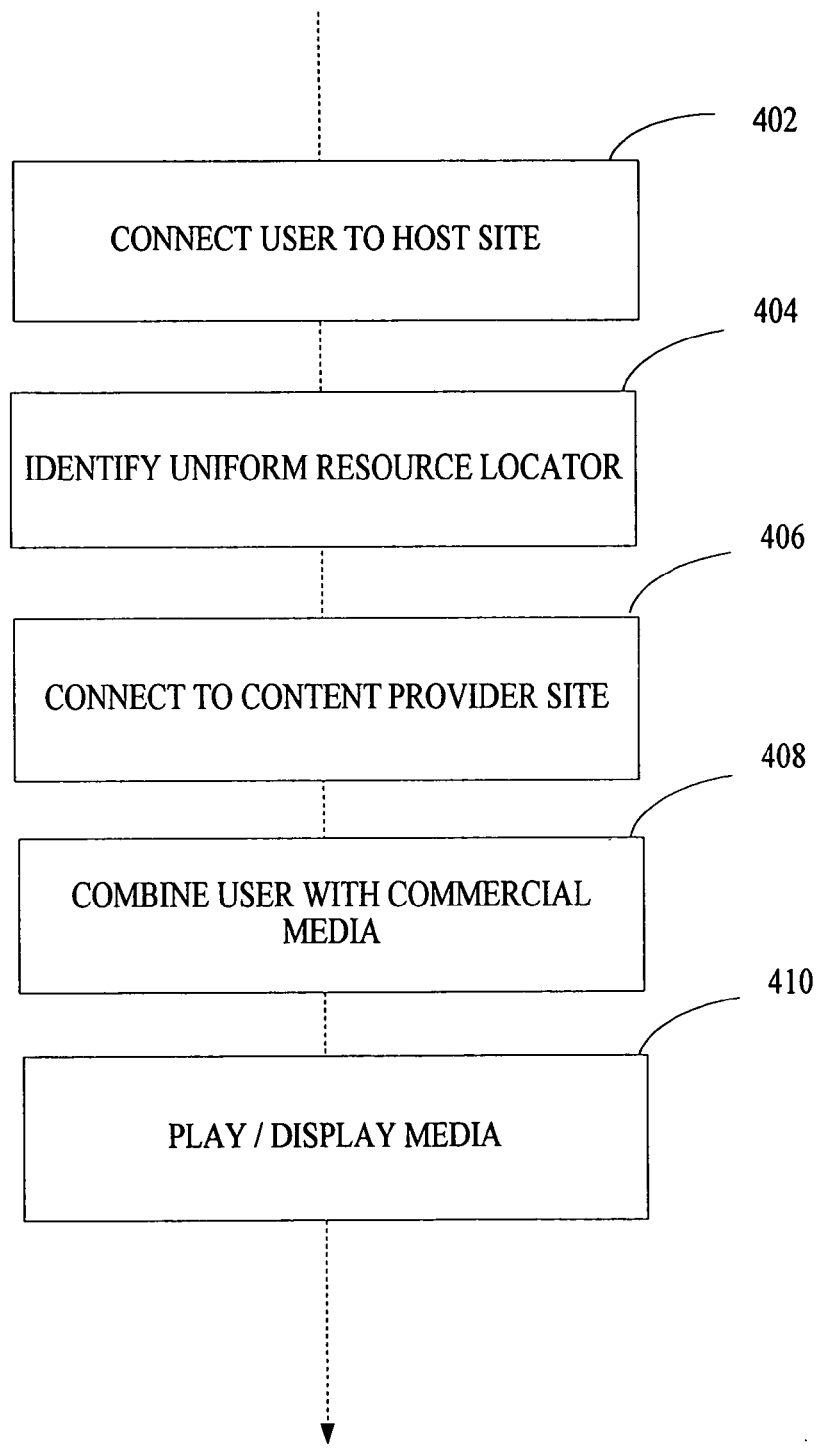
FIG. 4 is a partial flow diagram of a media identifier of FIG. 1.

When enabled, the system and method connects to the Host Site 108 automatically as shown in act 402 of FIG. 4. If the user programmed the alarm time at the Host Site 108, the Host Site 108 downloads the alarm time after the timing device 102 performs an initialization routine. At act 404, the system and method identifies the addresses of the user-selected resources or media. Using an on-line source, the system and method connects to the Content Provider Sites 126 and identifies and/or downloads media to the Host Site 108 and/or timing device 102 at act 406. The media and/or the URIs and URNs are then combined with content provider and/or commercial partner media in a defined or programmed order at act 408. If the media is stored at the Host Site 108, it is downloaded to the timing device 102 and played or displayed in delayed time at act 410. If the media comprises URIs and URN's, the media is played in real time preferably using a Real Time Transfer Protocol (RTP) as the transport protocol that preferably supports multicast applications. Preferably, the playback method supports real-time applications through the Content Provider Sites 126 and can be integrated with commercial media that is preferably played from a server resident to the Host Site 108 or the timing device 102.

Figure 5:
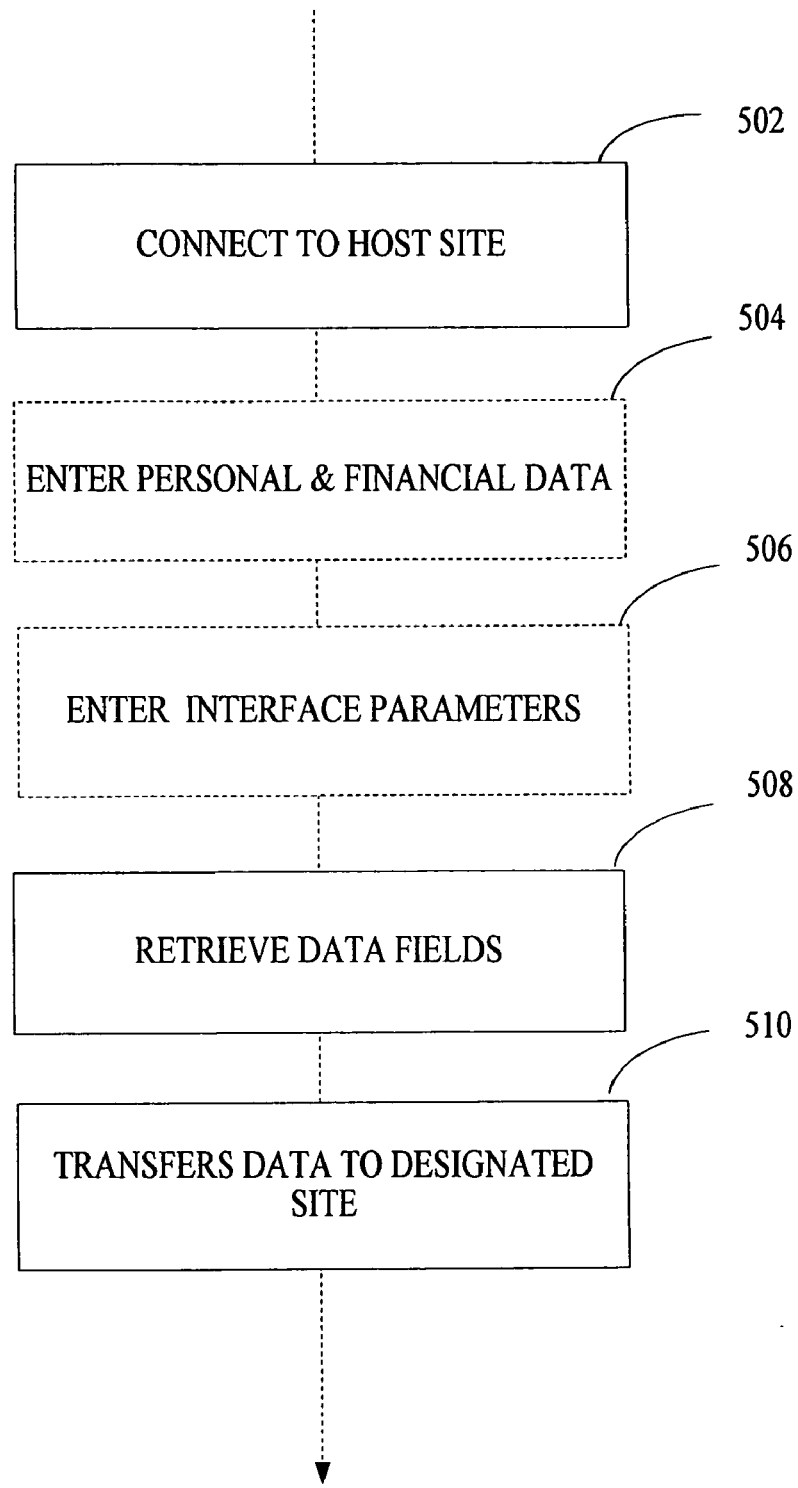
FIG. 5 is a partial flow diagram of a data exchange or sweepstakes entry of FIG. 1.

There are many compatible components to the system and method. FIG. 5 illustrates a data exchange or sweepstakes that is a unitary part of or interfaces the system and method in alternative embodiments. When selected, the system and method connects to the Host Site 108 at act 502. When connected, the user enters personal and financial data and interface parameters as described in acts 504 and 506. In some embodiments, the information is entered into a structured window, box, or other self-contained elements with predefined fields configured to receive the information like a graphical interface. The information is then stored in memory 116. Preferably, the information is stored with coding that allows the information to be uploaded. At act 508, the data is retrieved and at act 510 the data is transferred to the user designated and/or Commercial Provider Sites 140 and preferably to electronic sweepstakes entry forms. The data transfer can occur on user command, at a programmed time, during a programmed time interval and can reoccur at a programmable frequency that the user defines. The system and method can complete sweepstakes entries when the alarm is inactive or active.

Figure 6:
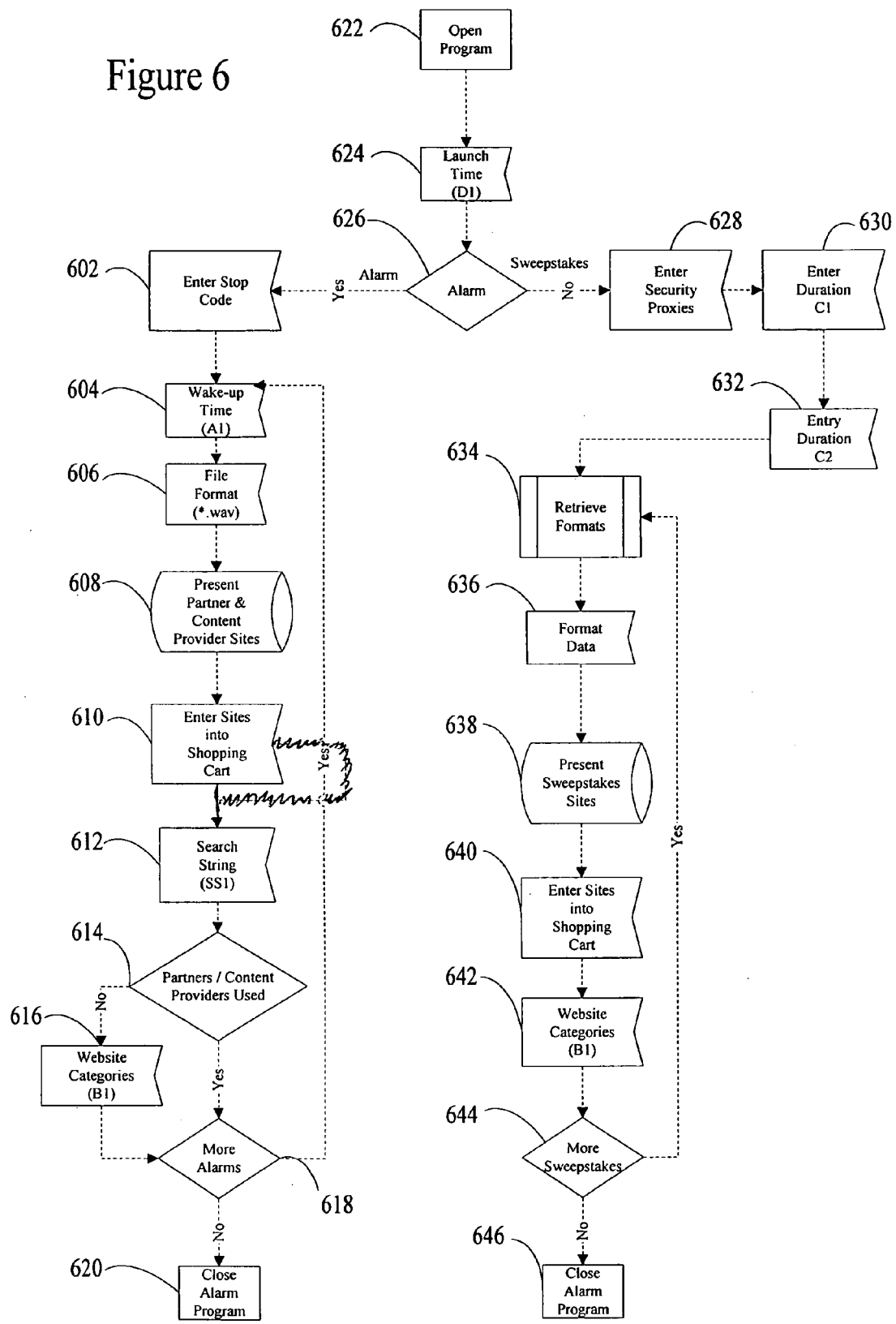
FIG. 6 is a partial flow diagram of a second embodiment.

FIG. 6 describes how a second embodiment of the system and method is configured. Through either the Host Site 108 and/or the timing device 102, the user configures the timing device 102 after opening the alarm program and programming or setting a launch time at acts 622 and 624. At act 602, the user enters a stop code. Preferably, the stop code is an instruction such as a keyboard, a pointer, a voice, or an input command that deactivates the alarm. At step 604, the user enters an activation or wake-up time (A1). If the alarm is not active, a power management process shuts down all unnecessary operations to save energy. At act 606, the user defines the file formats. Preferably, the formats define a location, the file storage structure, and how the file can be decoded.

At act 608, the user selects the Commercial Partner and Content Provider Sites 126 and 140. The Commercial Partner and Content Provider Sites 126 and 140 can include providers that broadcast news, sports, health, hobby, and other information. To subscribe to one or more Commercial Partner and Content Provider Sites 126 and 140, the user selects a channel by clicking on a graphical interface or enters a Site address. The timing device 102 instantly enters the selected URIs into a shopping cart and prompts the user to enter a search string at acts 610 and 612. In this embodiment, a shopping cart is software, such as Internet software, that is programmed to select and track user selections such as media selections or preferred Content Provider selections. If no Commercial Partner and Content Provider Sites 126 and 140 are selected, the user enters the URIs and search strings in acts 614 and 616. Of course, the user may also subscribe to a combination of Commercial Partner and Content Provider Sites 126 and 140 and user defined Sites. Additional alarms may be set at act 618 before closing the program at act 620.

If a user elects to use the data exchange or sweepstakes modules, the user enters personal proxies at act 628. The personal proxies are the user's personal authorization for the system and method to act on the user's behalf. Preferably, the user provides all of the necessary personal and/or financial information when the user registers or log on to the Host Site 108. At acts 630 and 632, the user enters the execution time (C1) and the frequency of the exchange (C2) at the timing device 102 and/or the Host Site 108 at acts 630 and 632. The frequency defines the number of forms or the time interval forms will be completed. The system and method retrieves the form formats or documents by accessing memory 116 or a remote Site. At act 636, the data is formatted into a character string. The character string may be transmitted to one or multiple remote Sites and/or entered into the electronic forms resident to the Sweepstakes Sites 138.

At act 638, the user selects the Sweepstakes Sites 138. The selected Sites can also include Commercial Partner and Content Provider Sites 140. To subscribe to one or more Sweepstakes Sites 138, the user selects a channel by clicking on a graphical interface or entering a Site address. The timing device 102 or Host Site 108 instantly enters the selected URIs into a shopping cart and prompts the user to enter other URI addresses that can receive the character strings at acts 640 and 642. If additional Sites are selected, the user enters the URIs and any additional strings or formats to be followed in acts 642. Additional sweepstakes may be entered at act 644 before closing the program at act 646.

Figure 7:
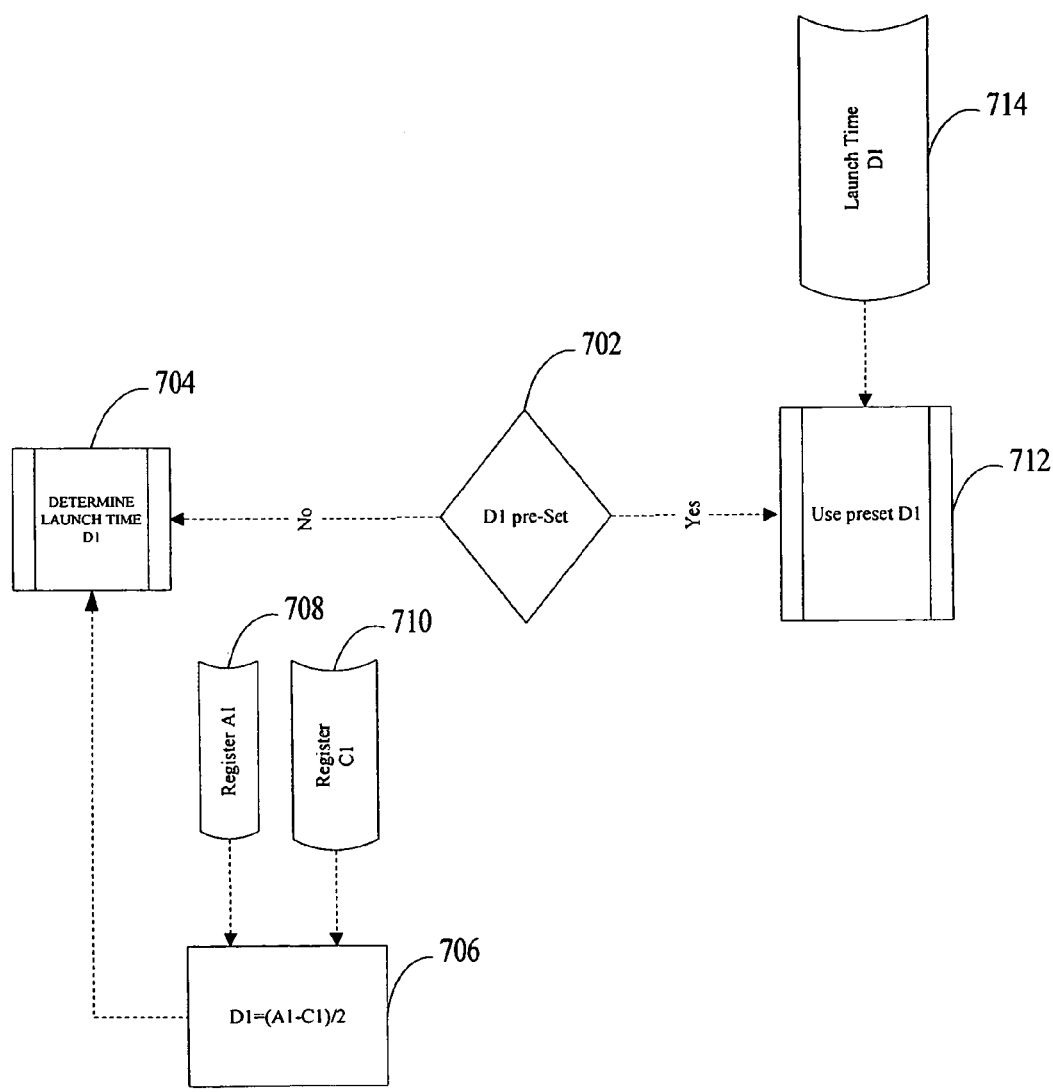
FIG. 7 is a partial flow diagram programming a launch of FIG. 6.

FIG. 7 is a partial flow diagram that programs the launch time of the second embodiment. The launch time is the time an alarm or data exchange occurs. The user enters a desired launch time directly at the timing device 102 or through the distributed network accessing the timing device 102 or the Host Site 108. If the time is entered at the Host Site 108, the Host Site 108 transfers the launch time to the timing device 102 after it is received and/or confirmed. Once the launch time is defined in the timing device 102, the system and method references the time for both the alarm and the data exchange/sweepstakes routine. Accordingly, the launch time is stored in memory 116 and retained as a preset value in acts 712 and 714. If the user does not define the launch time, the timing device 102 or Host Site 108 automatically derives the launch time. In the embodiment shown in FIG. 7, the launch time is derived by dividing the difference between the current time resident to register A1 and the execution time resident to register C1 by two as illustrated in acts 706, 708, and 710. Other instructions or algorithms that program the launch time are used in alternative embodiments just as multiple launch times may also be used.

Figure 8:
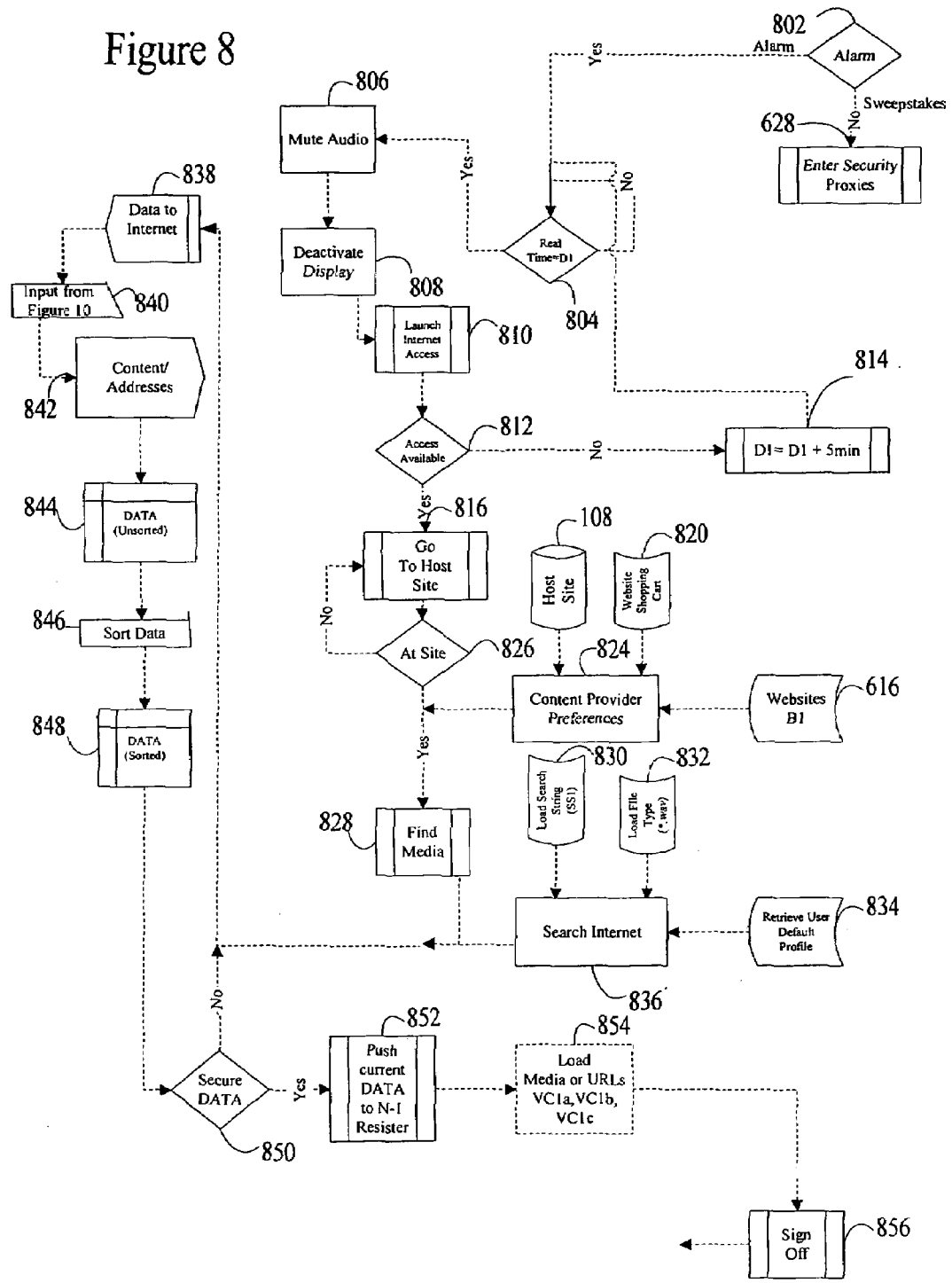
FIG. 8 is a partial flow diagram of a media and a resource identifier search of FIG. 6.

FIG. 8 is a partial flow diagram of the multimedia and resource identification search of the second embodiment. At act 802, the user selects either the alarm or the data exchange/sweepstakes routine. If the sweepstake routine is selected, the user is prompted to enter the user's security proxies before continuing the process illustrated in FIG. 6. If the alarm is selected, the system and method remains in a "sleep" mode keeping all of the unnecessary timing device 102 operations shut down until it approaches the execution time. Thus, the timing device 102 monitors the real time continuously so that it can wake up the operations as they are needed at act 804. When the real time comes within a programmed range of the execution time, the system and method awakes and automatically powers up operations as they are needed. At acts 806–810, the system and method mutes the audio output 122, deactivates the display 120, and attempts to access the Internet 124. Although the Internet 124 is used in this embodiment, other publicly accessible networks are accessed in alternative embodiments. If access to the Internet 124 is not available, the execution time is delayed by an offset period and access is reattempted until connectivity occurs in acts 804–814. If connectivity does not occur after a number of attempts, the alarm defaults to a simulated alarm, an accessible audio, multimedia, or text file. Preferably, the system and method also generates a text, graphic and/or an audio message that identifies the failure.

When connectivity occurs, the timing device 102 connects to the Host Site 108 through the user and site interfaces 104 and 106, the ISP 110, and the Internet 124 at act 816. If the Host Site 108 is not available, the timing device 102 re-attempts access to the Host Site 108 until a connection occurs at act 826. If connectivity does not occur after a number of attempts, the alarm defaults to a simulated alarm, an accessible audio, multimedia, or text file and preferably identifies the failure through text, graphics, and/or audio when the alarm sounds. At act 824, the commercial providers or content provider's preferences are linked to the user. The content provider's preferences are a combination of media files and/or URIs accumulated from the Host Site 108, Web Site shopping cart, and/or customized selections found at Web Sites B1 at acts 818–824. At act 828, the media files are separated from the URIs and the media, text, and audio clips are identified. Between acts 830–836, the user's search strings, format preferences, and default profiles are used to harvest information from the Internet 124. At acts 838–844, the media files and/or URIs are identified.

Once the media content is identified, the media is sorted at acts 846 and 848. Media in this embodiment includes not only information, but video, audio, multimedia, and product specific information including materials such as on-line catalogs. In alternative embodiments, the media is selected at random. To assure media integrity, the system and method authenticates the media content at act 850. Authentication may include scanning the content with an antiviral program or verifying the security certificates or digital identifications of the files and/or the URIs. If the URIs and/or media files are infected or originate from a questionable source, the system and method purges the questionable content and resumes the search until a predetermined number of media and/or URIs are found. When the search ends the media and/or URI's are downloaded, and stored in memory 116 at the Host Site 108 and/or the timing device 102 at act 852. If only URIs are identified, the multimedia and resource identifier signs off at act 856. If media files are identified, the system and method clears resident memory, downloads the media, and logs off the Internet at acts 854 and 856.

Figure 9:
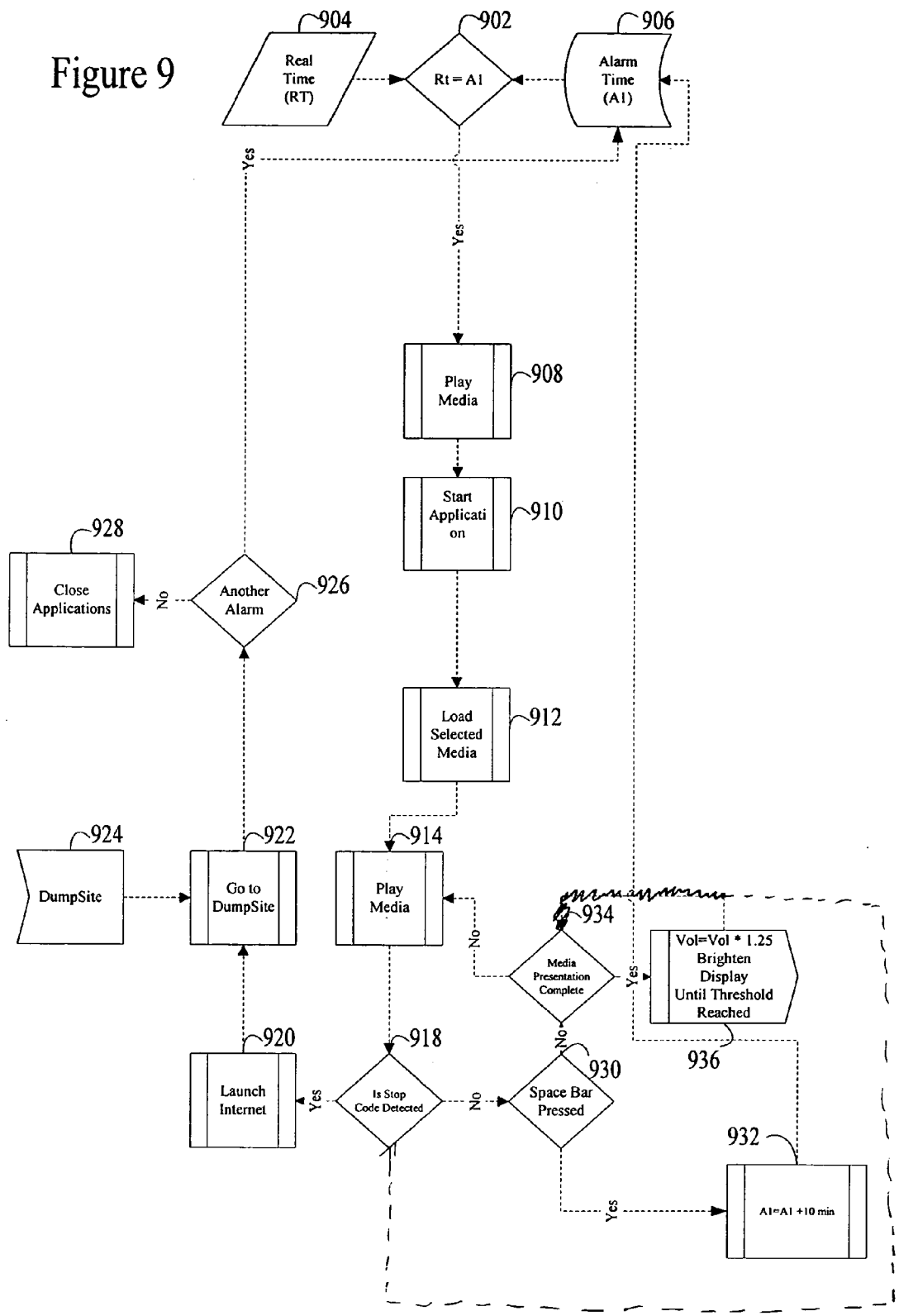
FIG. 9 is a partial flow diagram of an alarm of FIG. 6.

FIG. 9 is a diagram describing the operation of the alarm of the second embodiment. At act 902 the system and method monitor real time. When real time reaches the alarm time, the system and method displays an image or plays media and begins the application at acts 908 and 910. When the application starts, the system and method loads and/or downloads the ordered media and plays and/or displays the media at acts 912 and 914. If the media includes URIs, a Web Server resident to the timing device 102, the Host Site 108, and/or a remote Site plays the URI media in real time. If the media is retained in memory 116, a resident Server to the Host Site 108 and/or the timing device 102 plays the media. When a stop code is detected, the system and method interfaces the Internet 124 and jumps to a DumpSite or a Home Page that is selected by the user, a commercial partner, or a content provider at act 918–924. If additional alarms are set, the system and method powers down and enters a "sleep" mode until the next alarm time is reached at acts 926, 902, 904, and 906. In one embodiment, the system and method maintains an Internet 124 connection while monitoring real time.

To deactivate the alarm to "snooze," a user enters a command through a keyboard, a pointing device, a mouse, an auditory receiver, or an input device. In this embodiment, when the user presses the spacebar, the alarm is reset for an additional ten minutes at act 930. If neither the stop code nor the "snooze" command are detected, the display gets progressively brighter and/or the volume gets progressively louder until a programmed threshold is reached at act 936. Otherwise, the media plays until an external event occurs or a time interval lapses.

Figure 10:
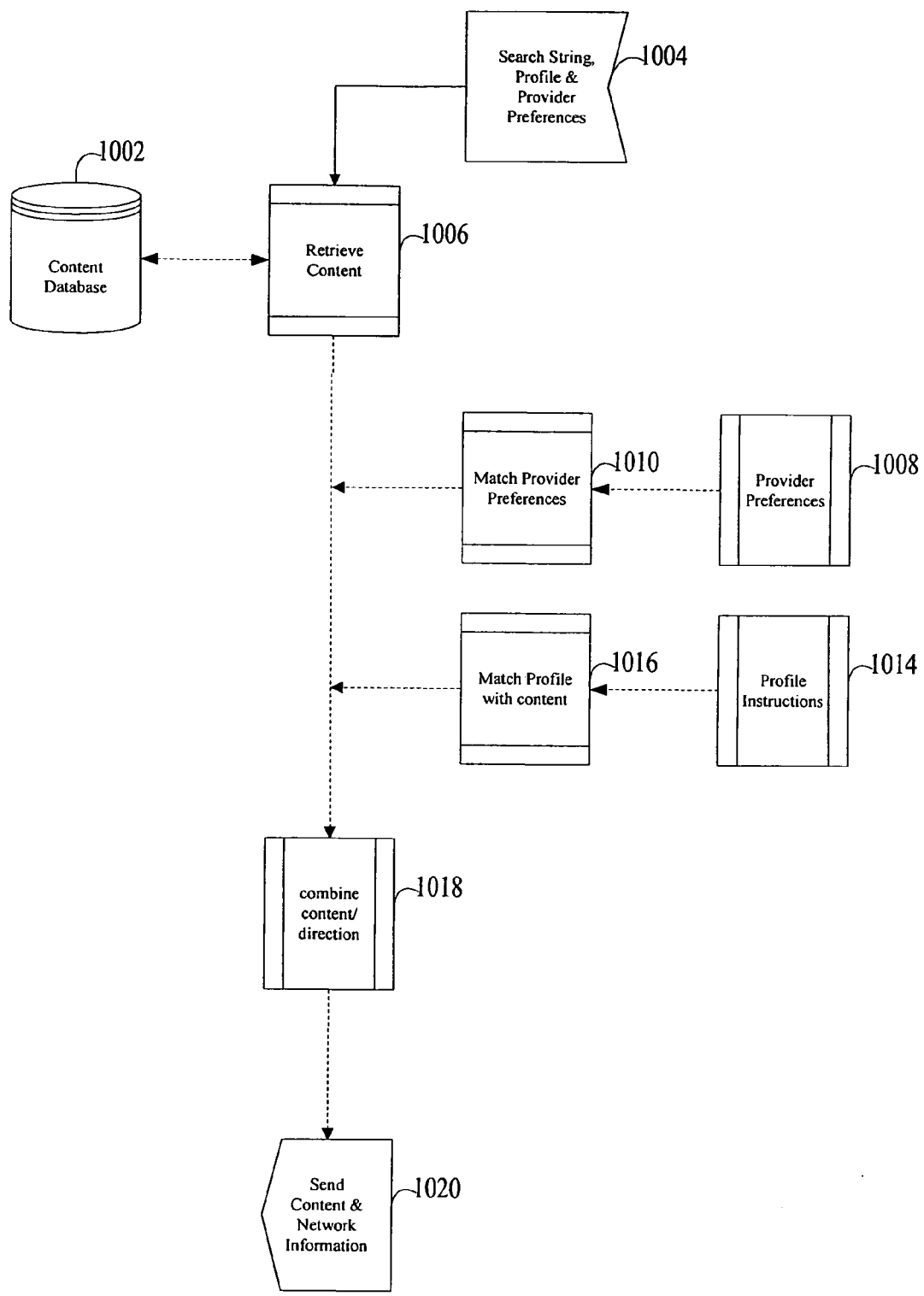
FIG. 10 is a partial flow diagram of a combination sequence of FIG. 6.

FIG. 10 is a partial diagram of a combination sequence of the second embodiment. A content database 1002 comprises a flexible database that supports many data types, objects, and classes and stores a wide range of data, including sound, video, graphics, multimedia and text. The content database, which also comprises accessible databases linked through the Internet 124 in this embodiment, allows data retrieval and processing based on the user's, commercial partner's and content providers' preferences in acts 1004 and 1006. The user's, commercial partner's, and content providers' preferences are preferably stored in flexible databases. Using the commercial partners', content providers' preferences and user profiles, the system and method selects media and documents in acts 1008, 1010, 1014, and 1016. The selection can be based on a rule based method, through a neural network, by a collaborative filtering and/or by other means. In act 1018, the system and method combines media selection based on a user, a commercial partner, a content provider, or the Host Site's 108 defined criteria, which are played or displayed in act 914 of FIG. 9. If the media is combined at the Host Site 108, the media combination is sent to the timing device 102 before being played or displayed at act 1020. In alternative embodiments, the content database is resident to the timing device.

Figure 11:
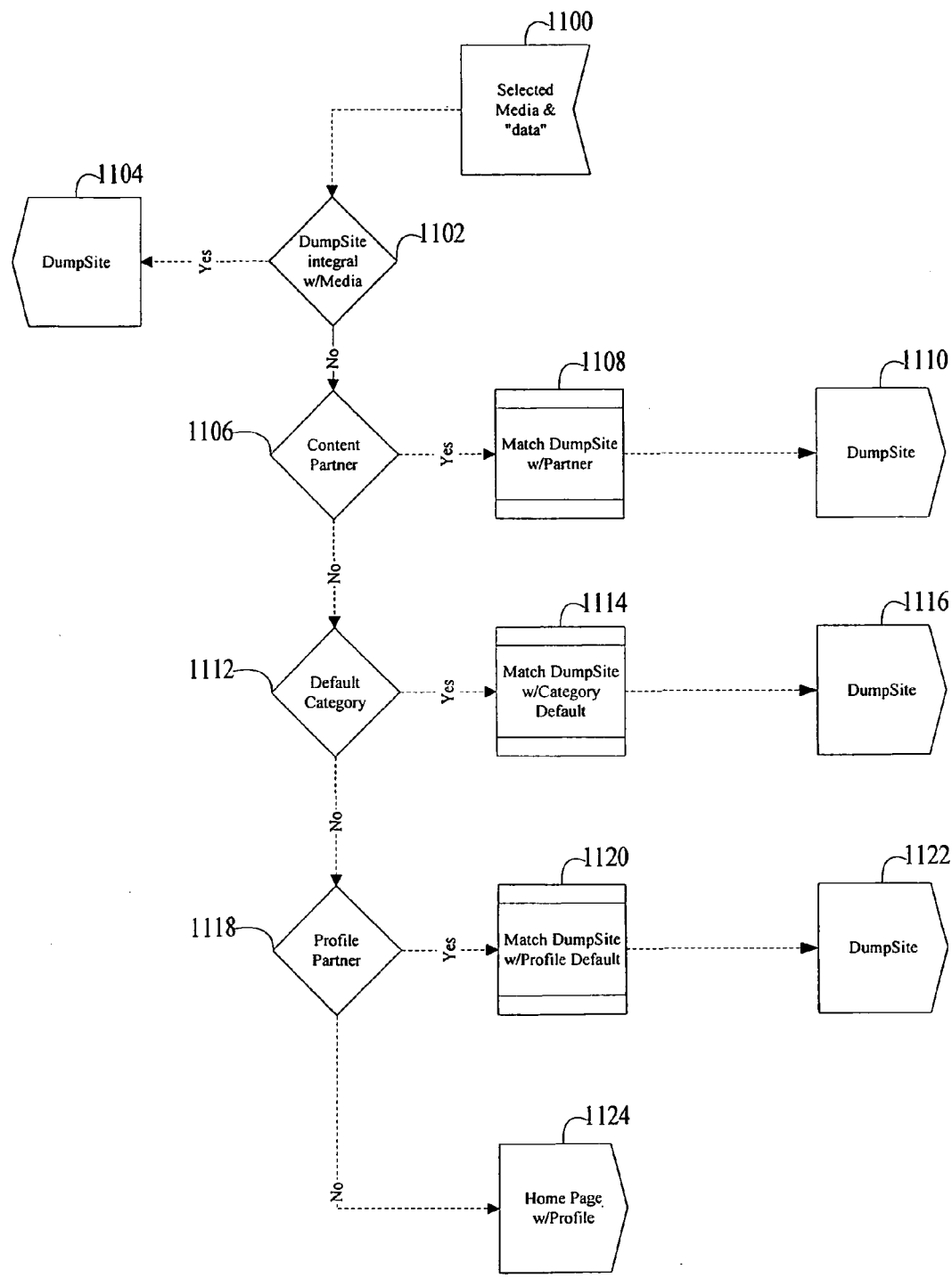
FIG. 11 is a partial flow diagram a of DumpSite selection of FIG. 6.

FIG. 11 is a partial diagram of a DumpSite Selection that is used in acts 922 and 924 of FIG. 9. The URI of a DumpSite can be defined through many methods. As illustrated, the DumpSite may be defined by the media selections. In acts 1100, 1102, and 1104, the DumpSite address is decoded by processing media that is combined with a DumpSite address or instruction. If the DumpSite is not encoded within the media, the system and method attempts to assign one of the partner's Site selections in acts 1106, 1108, and 1110. If the DumpSite is still not assigned, the system and method relies on the system and method defaults to define the DumpSite selection. If a DumpSite address is still not defined, the system and method references the user, commercial partner, or content provider's profiles to assign a DumpSite address. If a DumpSite address is still not assigned, the Host Site 108 determines the DumpSite address.

Figure 12:
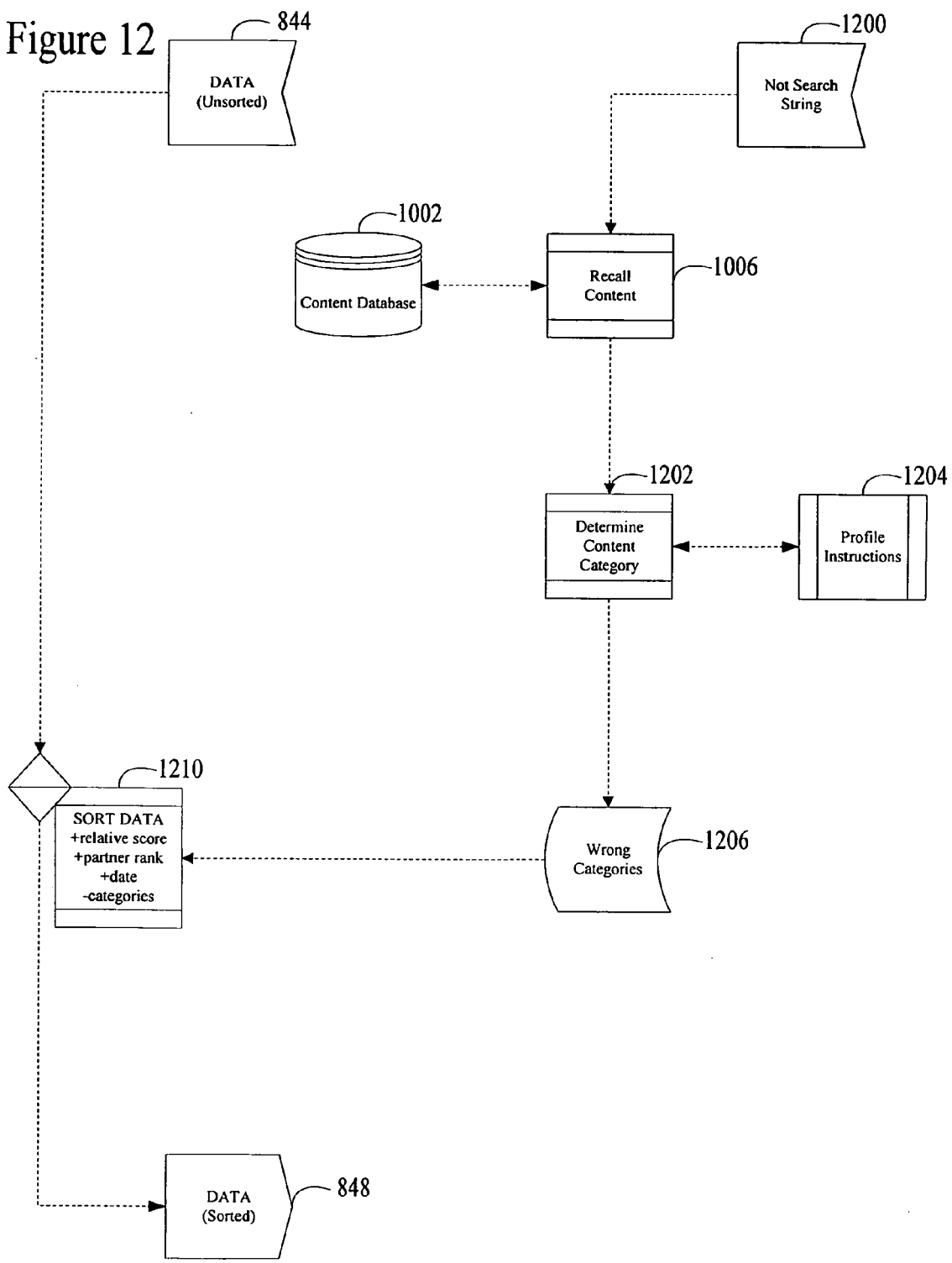
FIG. 12 is a partial flow diagram of a sort of FIG. 6.

FIG. 12 is a partial flow diagram of a sort of the second embodiment which includes the optional act of excluding media. Thus, the system and method not only gathers and formats results but also parses the media using exclusion strings defined by the user, commercial provider, and/or Host Site administrator. In this embodiment, the system and method separates categories defined by the exclusion string in acts 1202, 1204, and 1206. The exclusion string and profile instructions define the categories that the system and method separates from the unsorted data in act 1206. In act 1210 the media is sorted using a method that applies a ranking and date criteria. Media that falls within the excluded categories is also removed without user intervention.

The above-described system and method preferably is a unitary part of or integrated within a personal computer or a handheld device that has a semiconductor-based flat display, audio amplifier output, parallel and serial interfaces including a universal serial bus (USB), and a backup or primary battery or alternative power source. The system and method utilizes an operating system that decodes a broadcast containing a standard time signal and/or generates and measures a steady stream of timing pulses. To ensure security, access codes and hardware keys may be integrated within or are a unitary part of the system and method. Preferably, user identifications (IDs) and passwords are also used. The user identifications and passwords are validated against Internet protocol (IP) addresses or a range of IP addresses stored at the Host Site 108. If an IP address is not within a validation table resident to the Host Site 108, a hardware key may be interfaced to the serial or the parallel interfaces of the timing device 102 to access the system and the method. Furthermore, preferably the operating software allows only one user ID to be logged into the Host Site 108 at one time to maintain security and ensure the integrity of the data and media.

To improve the quality and service of the system and the method, media is harvested from free and paid sources. While some embodiments may be freely distributed or offered as a shareware device, other embodiments may be sold through licensing and/or membership agreements, in part, to compensate copyright owners. In some embodiments, content providers and copyright material providers designate an interim Site or DumpSite after the provided material is viewed. The Site designation can be based on a user's profile or may be selected at the provider's discretion. The designation can be determined at the providers Site 126, the Host Site 108, the Partner Sites 140 and/or by criteria within the timing device 102. Moreover, in some alternative embodiments the system and method may include a voice recognition system or a circuit that understands and executes spoken commands in a variety of speech patterns and accents. Preferably, the voice recognition circuit is a unitary part of or integrated within the Host Site 108 and preferably does not require any voice training or voice programming. By speaking to the timing device 102, the timing device interfaces 102 the Host Site 108 via the Internet 124 and can execute instructions through voice commands.

Many other alternatives are also possible. In another alternative embodiment, the system and method do not interface with a Host Site 108. In these embodiments, the timing device 102 receives user input, directly harvests the user selected media, combines the user selected media with commercial partner and content provider preferences, such as commercials and solicitations, for example, and plays and/or displays the results by connecting to URIs and URN's through a distributed network or by playing media files downloaded to memory 116. In yet another embodiment, the media and the firmware are retained within the timing device.

The invention seamlessly combines digital hardware with a customized method that tracks time and displays and/or broadcast up-to-the-minute or real time audio and/or visual information such as the news, headlines, and/or sports. The system and method accesses audio and visual information without user interaction after the system and method is set. The system and method are accessible; both the system and method can be programmed and set at the timing device 102 or remotely via the publicly accessible network interfacing the Host Site 108 and/or the timing device 102. The system and method are reliable. In those embodiments configured to receive broadcasts containing the standard NIST time signal, time is kept to within less than 10 milliseconds ($\frac{1}{100}$ of a second) of the Coordinated Universal Time (UTC).

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A system for providing a multi-media alarm, comprising:
   a publicly accessible network;
   a user interface in communication with the publicly accessible network; and
   a handheld timing device in communication with the user interface, the timing device being configured to track a universal time and harvest a user selected media that is played in a programmed order with a selected commercial media at a user determined time through the handheld timing device, wherein the timing device is further configured to play multimedia that provides an increase in at least one of a user's state of arousal or consciousness.

2. The system of claim 1 wherein the media comprises an audio and a video content.

3. The system of claim 1 further comprising a transceiver interfaced to the timing device.

4. The system of claim 3 wherein the transceiver is tuned to receive a broadcast containing a Coordinated Universal Time signal.

5. The system of claim 4 wherein the timing device and the transceiver are a unitary device.

6. The system of claim 1 further comprising an audio output and a display that play the user and the commercial selected media, the output and display being a unitary part of the timing device.

7. The system of claim 6 wherein the timing device is further configured to translate the user and the commercial selected media into a progressive alarm.

8. The system of claim 1 further comprising a Host Site in communication with the publicly accessible network, wherein the Host Site is configured to combine the user selected media with the commercial selected media while downloading the user selected media with the commercial selected media into the timing device.

9. The system of claim 1 further comprising a Host Site interfaced to the publicly accessible network, wherein the Host Site and the timing device are configured to program the time and an alarm in the timing device.

10. The system of claim 9 further comprising a speech synthesizer that is a unitary part of the timing device.

11. The system of claim 9 further comprising a closed captioning system that is a unitary part of the timing device.

12. The system of claim 1 wherein the timing device comprises an atomic clock.

13. The system of claim 1 wherein the timing device is configured to access a DumpSite selected by at least one of a content provider, a commercial provider, a user, or a default Site after playing the media.

14. The system of claim 13, wherein the DumpSite is coupled with the publicly accessible network, further wherein the Host Site and the user interface are configured to select the DumpSite.

15. The system of claim 1 wherein the timing device is configured to filter the user selected media by removing selected media.

16. The system of claim 15 wherein the harvested media is stored in memory dispersed across the Internet.

17. The system of claim 1 wherein the timing device is configured to complete sweepstakes entries by entering data into sweepstakes forms.

18. The system of claim 1 wherein the handheld timing device comprises a computer.

19. A system for providing a multi-media alarm, comprising:
a publicly accessible network;
a Host Site interfaced to the publicly accessible network; and
a handheld timing device in communication with a user interface, the timing device being configured to track universal time and harvest a user selected audio and visual addresses through the Host Site, the timing device further comprising a media player configured to play the audio and visual information by access the audio and visual addresses and playing audio and visual information in a programmed order with a selected commercial media at a predetermined time in a real time, wherein the timing device is further configured to play multimedia that provides an increase in at least one of a user's state of arousal or consciousness.

20. The system of claim 19, wherein the timing device is configured to access a DumpSite selected by at least one of a content provider, a commercial provider, a user, or a default Site after playing the media, wherein the DumpSite is coupled with the publicly accessible network, further wherein the Host Site and the user interface are configured to select the DumpSite.

21. A system for providing a multi-media alarm, comprising:
a publicly accessible network;
a user interface in communication with the publicly accessible network; and
a handheld timing device in communication with the user interface, the timing device being configured to track a universal time and harvest a user selected media that is played in a programmed order with a selected commercial media at a user determined time through the handheld timing device, wherein the timing device is configured to filter the user selected media by removing selected media.

22. A system for providing a multi-media alarm, comprising:
a publicly accessible network;
a user interface in communication with the publicly accessible network;
a handheld timing device in communication with the user interface, the timing device being configured to track a universal time and harvest a user selected media that is played in a programmed order with a selected commercial media at a user determined time through the handheld timing device;
a Host Site interfaced to the publicly accessible network, wherein the Host Site and the timing device are configured to program the time and an alarm in the timing device; and
a speech synthesizer that is a unitary part of the timing device.

23. A system for providing a multi-media alarm, comprising:
a publicly accessible network;
a user interface in communication with the publicly accessible network;
a handheld timing device in communication with the user interface, the timing device being configured to track a universal time and harvest a user selected media that is played in a programmed order with a selected commercial media at a user determined time through the handheld timing device;
a Host Site interfaced to the publicly accessible network, wherein the Host Site and the timing device are configured to program the time and an alarm in the timing device; and
a closed captioning system that is a unitary part of the timing device.

24. A system for providing a multi-media alarm, comprising:
a publicly accessible network;
a user interface in communication with the publicly accessible network; and
a handheld timing device in communication with the user interface, the timing device being configured to track a universal time and harvest a user selected media that is played in a programmed order with a selected commercial media at a user determined time through the handheld timing device, wherein the timing device is configured to filter the user selected media by removing selected media, wherein the timing device is configured to complete sweepstakes entries by entering data into sweepstakes forms.

* * * * *